UNITED STATES PATENT OFFICE.

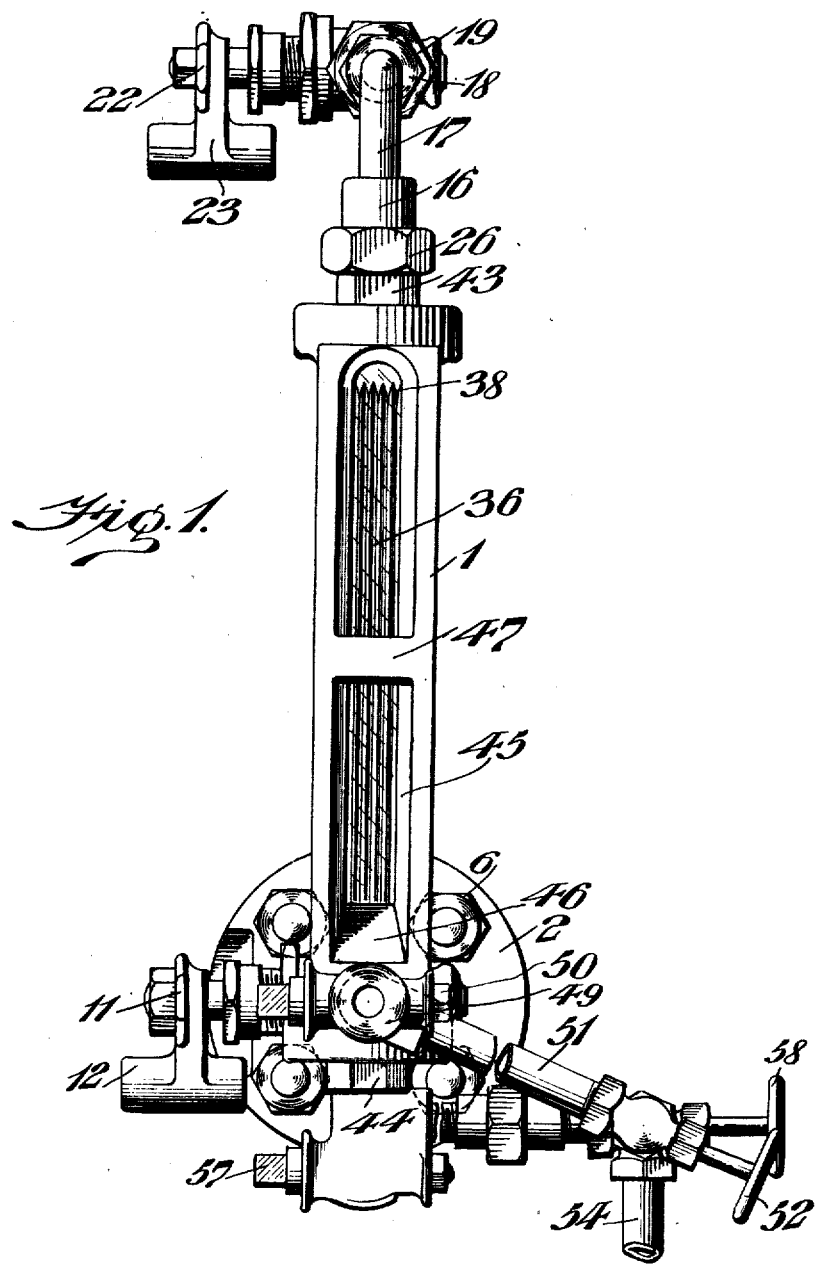

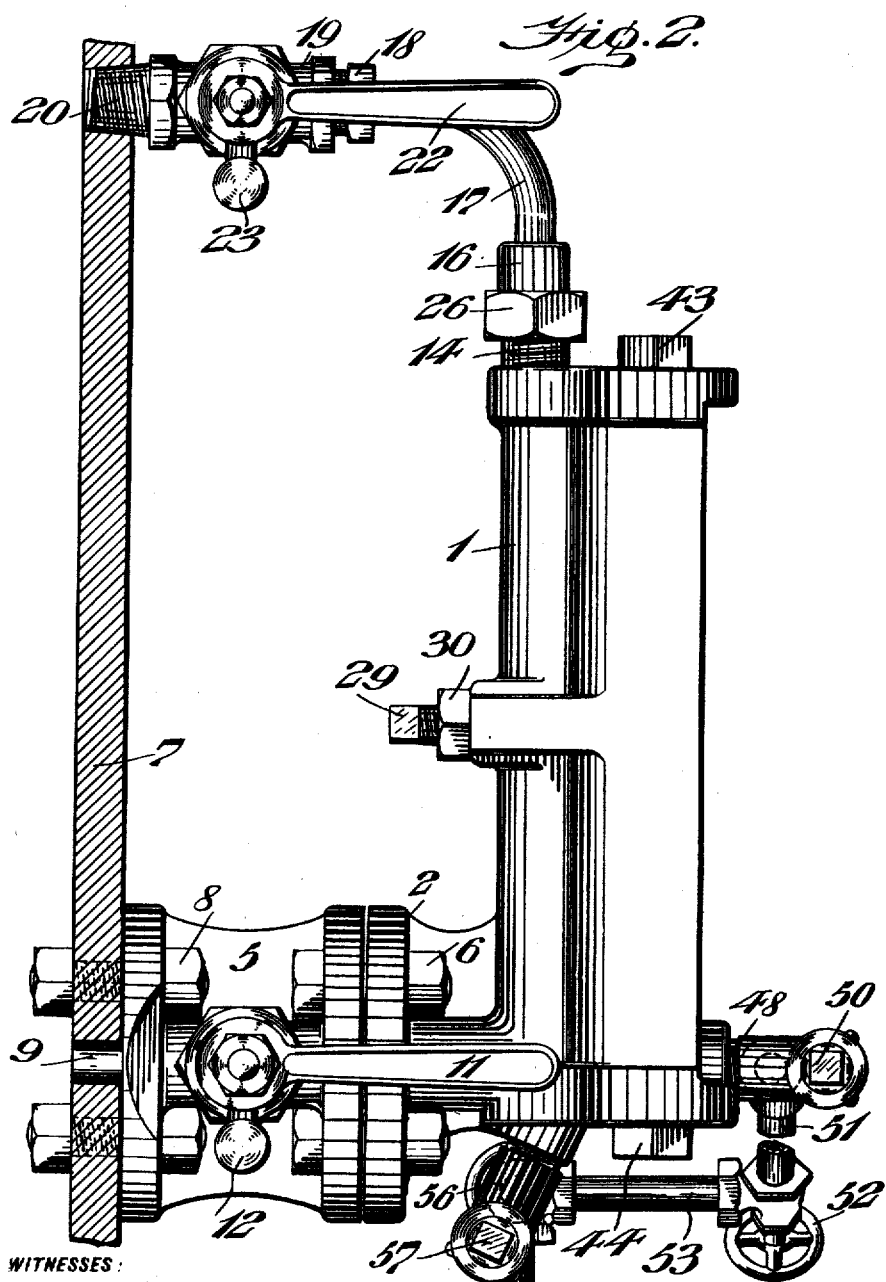

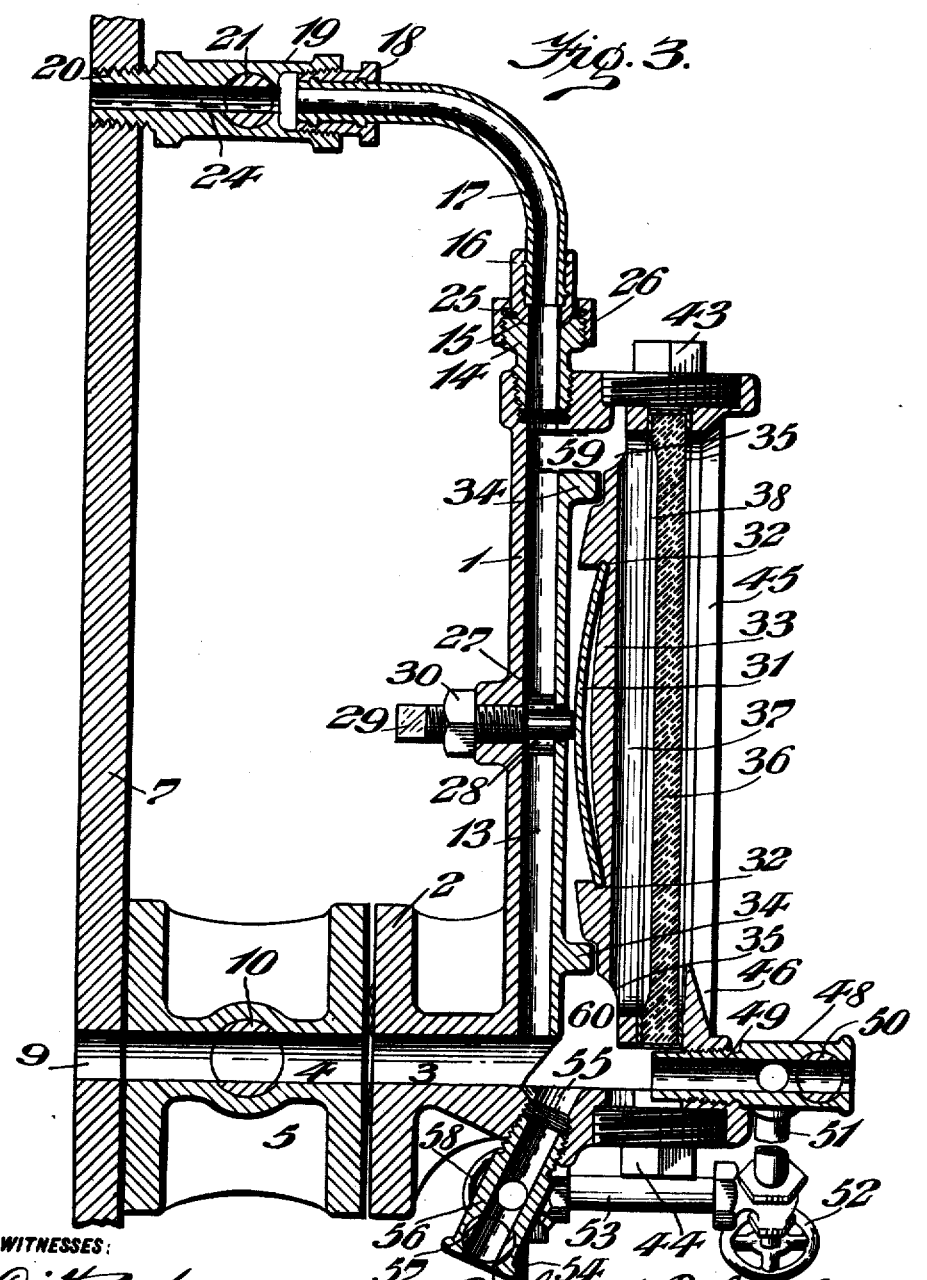

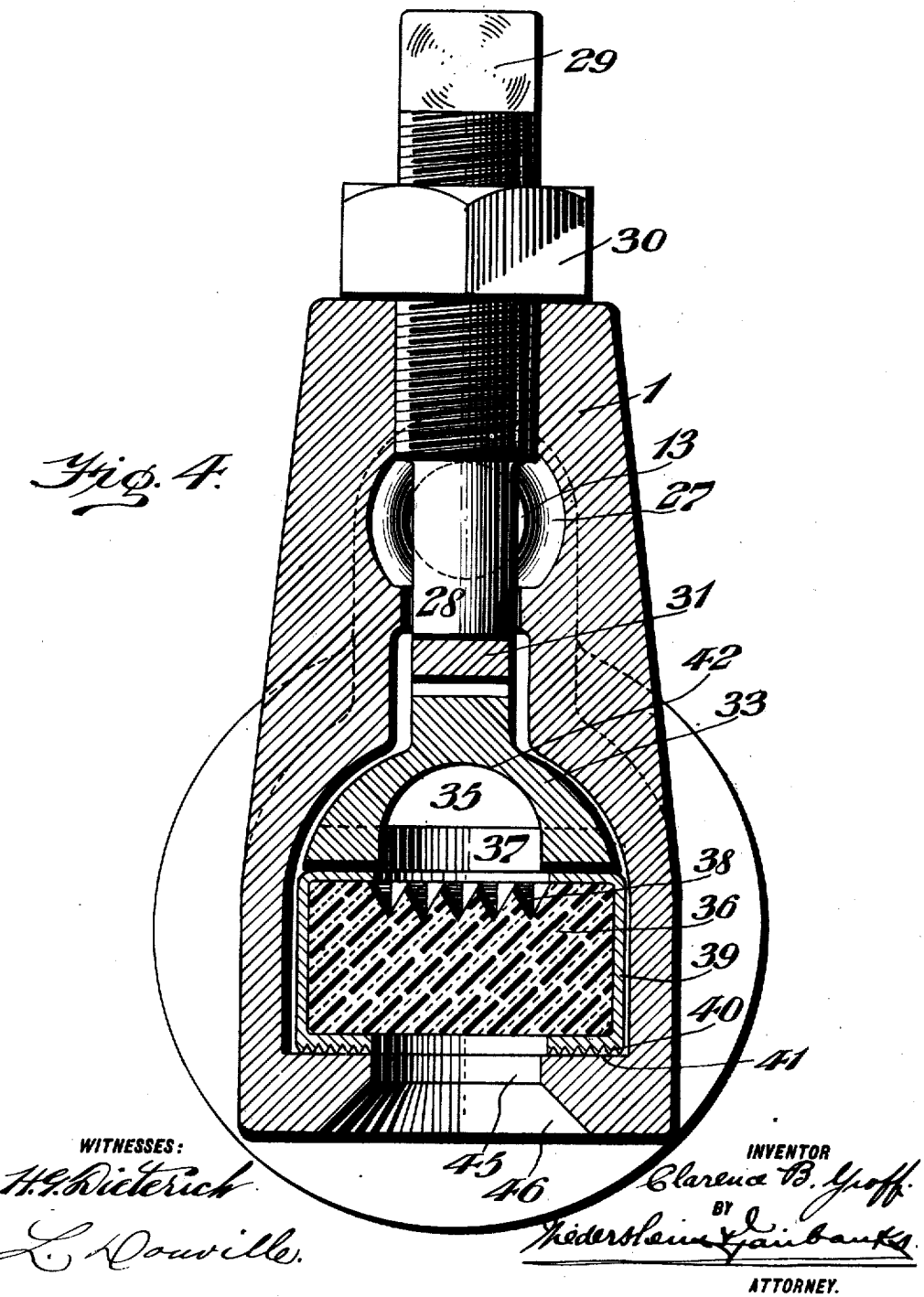

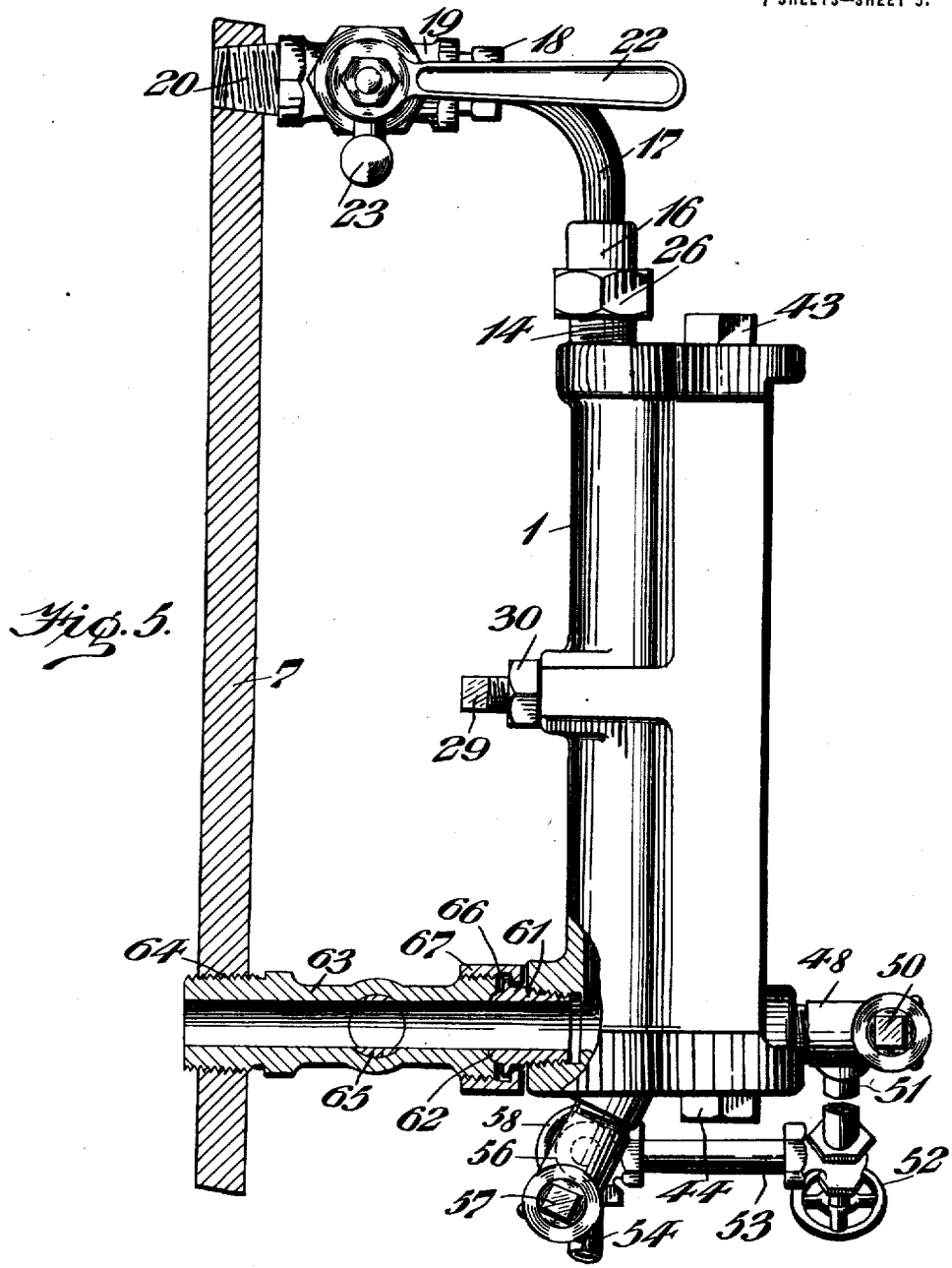

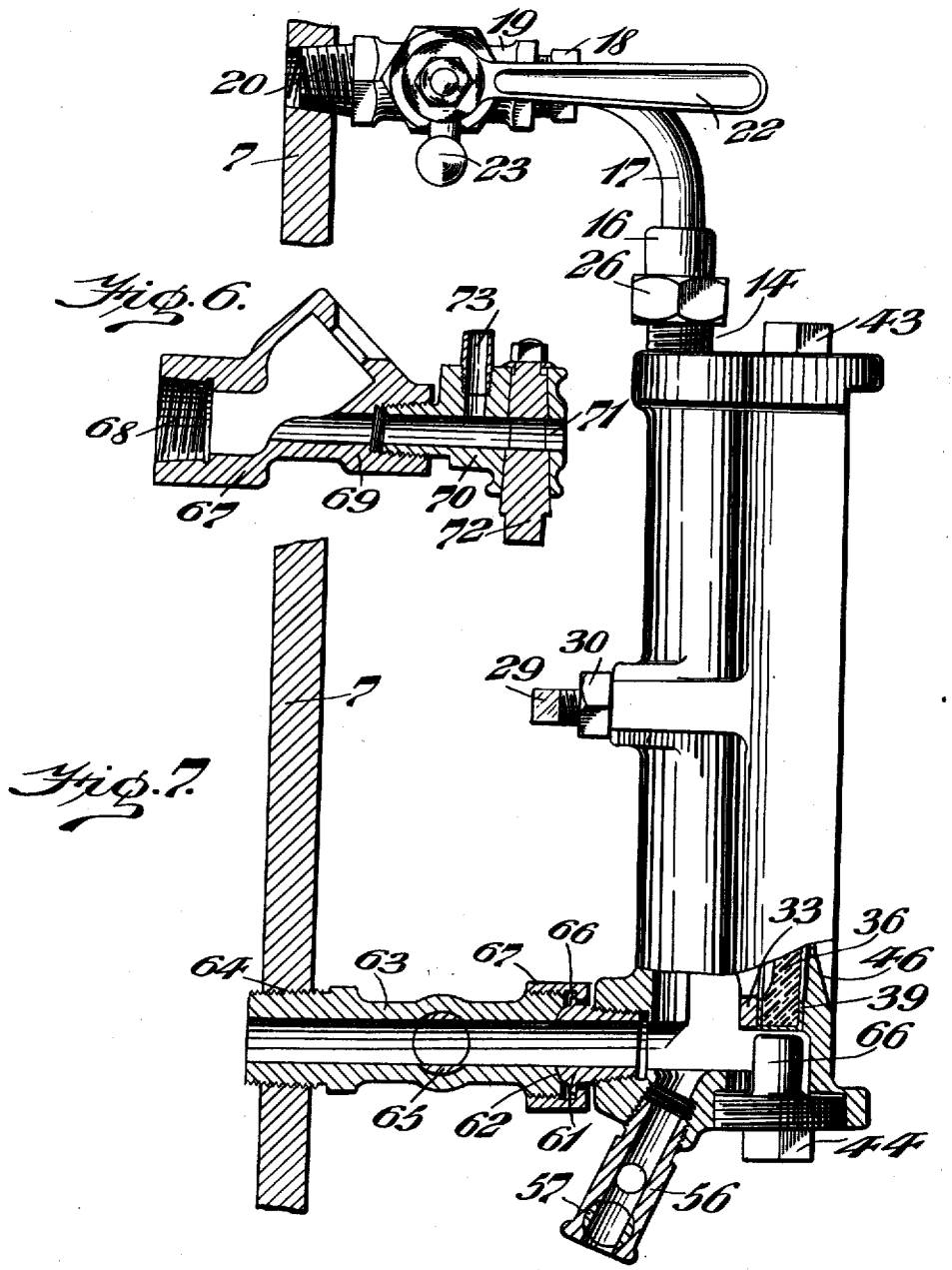

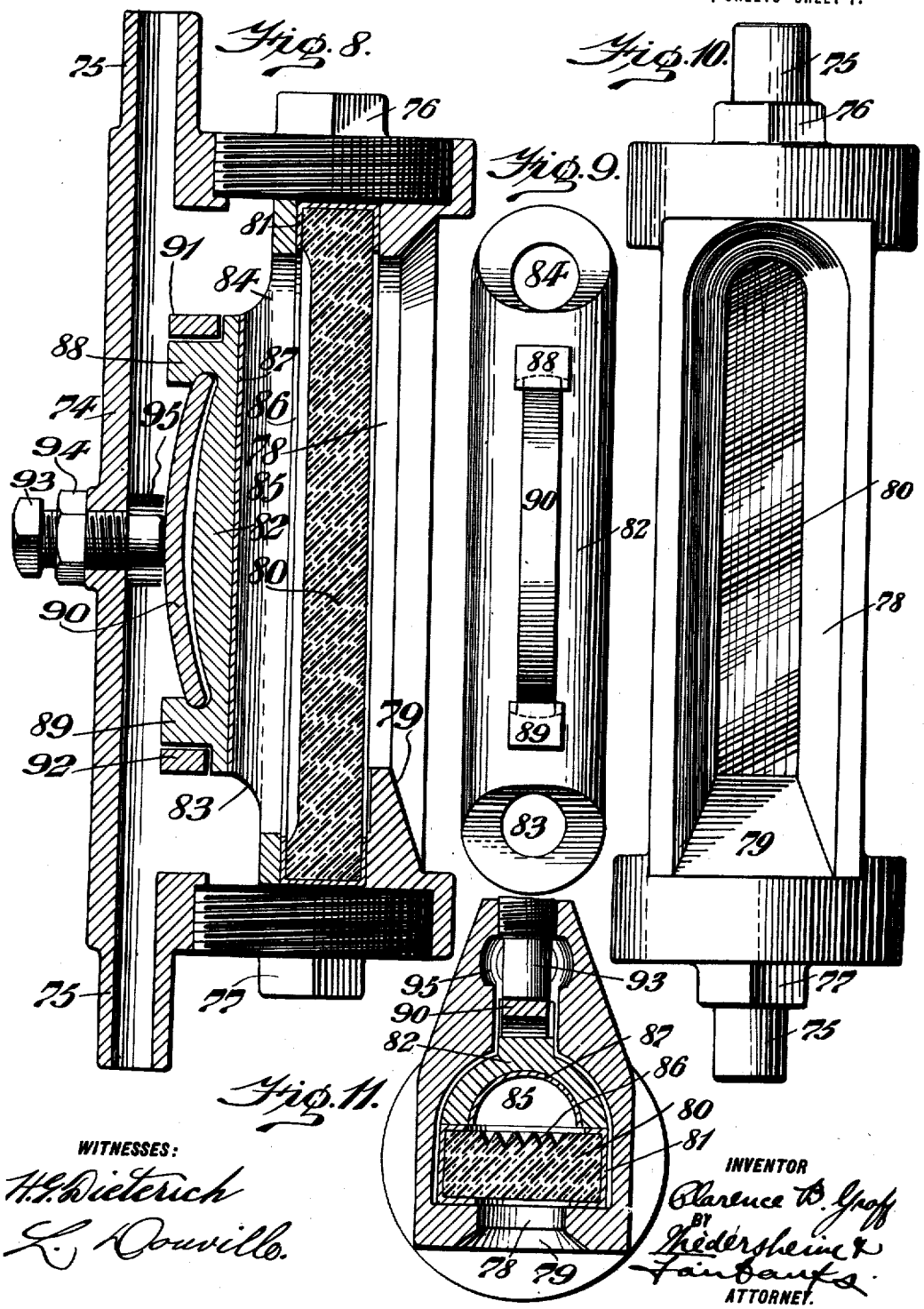

CLARENCE B. GROFF, OF HADDON HEIGHTS, NEW JERSEY.

WATER-GAGE SYSTEM.

1,202,511.  Specification of Letters Patent.  Patented Oct. 24, 1916.

Application filed October 13, 1911. Serial No. 654,468.

*To all whom it may concern:*

Be it known that I, CLARENCE B. GROFF, a citizen of the United States, residing at Haddon Heights, in the county of Camden, State of New Jersey, have invented a new and useful Water-Gage System, of which the following is a specification.

My present invention consists of a novel water gage system in which means are provided for compensating for and overcoming strains on the glass and frame due to the expansion and contraction caused by heat and cold and by high and low pressures, whereby I am enabled to produce a gage, the durability, life and reliability of which are greatly increased, and wherein the loss, damage and liability to personal injury, due to leakage, erosion, and breakage of gage glasses are practically eliminated.

It further consists of a novel construction of a water gage system wherein a shrouded or metal incased glass is used in a novel manner, whereby a double seal is formed on the glass in order to prevent leakage and the destruction of the glass.

It further consists of a novel means of securing an incased or shrouded glass with respect to its seat.

It further consists of a novel means of securing a shrouded glass in position so that the shrouding serves as a sealing gasket.

It further consists of a novel construction of a water gage system wherein a shroud or metal incased glass is used in a novel manner, whereby the edges of the shroud or casing surrounding the sight opening are held firmly in position on the glass, thereby preventing the stripping off and destruction of the shroud by the fluid contents of the gage.

It further consists of a novel construction of an intermediate member provided with elastic or resilient means, such means being fulcrumed on an adjustable abutment whereby the tension of the elastic or resilient means may be varied as desired.

It further consists of a novel construction of a water gage system wherein the destructive action of the steam on the glass when blowing out the passageways is practically eliminated, since in my novel device the steam passage is out of alinement with the glass and in alinement with the blow-off connection, and a separate water column is provided.

My invention further consists of a novel construction of a gage system wherein means are provided for removing obstructions, such as sediment, lime or other accumulations, from the water passage connecting from the boiler to the water column by the insertion therein of a brush or other implement, thereby securing at all times a clear passageway from the boiler to the water column and insuring reliable readings on the gage.

It further consists of a novel construction of a water gage system whereby novel means are provided for cleaning the water column and glass with a brush or other instrument without removing the fittings from the frame, insuring correct and reliable readings on the gage.

My invention further consists of a novel construction of a water gage system wherein novel means are provided for a blow-off system, one connection of which communicates directly with the water connection to the boiler and permits the blowing off of this connection independently of the steam connection.

It also provides means of blowing off the steam connection through an independent passageway in the rear of the frame, communicating directly with the blow-off connection, or it permits the blowing of both of these connections at one time. The valves for the blow-off system may be located at any convenient point on the piping system of the blow-off.

It further consists of a novel construction of a frame having openings in proximity to the ends of the gage glass provided with removable closures.

It further consists of a novel construction of a frame having ends in proximity to the ends of the glass provided with removable closures whereby the seat for the glass may be accurately formed and the glass and the means of retaining it in a sealed condition may be readily removed through either of said openings.

It further consists of a novel gage using a reflex gage glass wherein novel means are provided for rendering a much lower reading than has heretofore been possible with prior devices of this character, and providing novel means for covering up the lower clear portion of said glass in order to prevent a mistake in the reading of a disappearing water column.

It further consists of a novel construction of a gage system having a flexible connection of any desired length at the steam end of the gage, communicating by an independent steam passage-way in the gage frame with the blow-off system, to compensate for the expansion and contraction of the frame.

It further consists of other novel features of construction, all as will be hereinafter set forth.

For the purpose of illustrating my invention, I have shown in the accompanying drawings preferred embodiments thereof since the same have been found in actual practice to give satisfactory and reliable results, although it is to be understood that the various instrumentalities of which my invention consists can be variously arranged and organized and that my invention is not limited to the precise arrangement and organization of these instrumentalities as herein shown and described.

Figure 1 represents a front elevation of a water gage system embodying my invention. Fig. 2 represents a side elevation thereof showing the parts as attached to the boiler. Fig. 3 represents a sectional elevation of my device. Fig. 4 represents a transverse section on line $x$—$x$ of Fig. 1. Fig. 5 represents a side elevation, partly in section, showing a different manner of connecting the gage proper with the boiler. Fig. 6 represents a sectional view of a portion of Fig. 7 on line $y$—$y$ of said figure. Fig. 7 represents a side elevation similar to that seen in Fig. 5, but having certain of the parts broken away for the sake of clearness of illustration. Fig. 8 represents a sectional elevation of another embodiment of my invention. Fig. 9 represents a rear elevation of a portion of Fig. 8 in detached position. Fig. 10 represents a front elevation of Fig. 8. Fig. 11 represents a transverse section on line $z$—$z$ of Fig. 8.

Similar numerals of reference indicate corresponding parts in the figures.

Referring to the drawings:—My novel water gage system as herein disclosed provides for a standard gage being employed, and such gage is adapted to be connected with any desired or conventional type of boiler.

1 designates the gage frame which is connected to the boiler in any desired manner, and in the embodiment seen in Figs. 1 to 4, inclusive, is provided with a flanged extension 2, which is apertured as indicated at 3, said aperture communicating with the aperture 4 of a double flanged union 5, which is secured to the flanged extension 2 by means of fastening devices 6, the union 5 being also secured to the boiler wall 7 by means of fastening devices 8, so that the port 9 through the boiler wall 7 will register with the passage 4 in the union 5.

10 designates a valve controlling passage of fluid through the passage 4, said valve being provided with an actuating handle 11 and counterbalance 12, whereby any likelihood of the accidental closing of the valve due to jar or vibration, such as, for example, that which is received by a locomotive engine, is positively eliminated.

13 indicates a passage extending through the frame 1 and communicating with an apertured connection 14, one end of which is in threaded engagement with the frame 1, while the other end thereof has a ground joint connection at 15, with a coupling member 16, which latter is brazed or otherwise secured to a conduit 17, which is preferably copper, and which may be of any dimensions suitable for the boiler connections. This conduit 17 is constructed of such material that it will take care of the expansions and contractions lengthwise of the frame, the flexibility of the conduit itself aiding this action, and owing to this novel feature of my invention I have overcome the difficulty attending the use of stem ends in connection with which it is necessary to utilize a packing which always causes more or less trouble, either due to leakage or the obstruction of the passageway. The outer end of the conduit 17 has brazed or otherwise secured thereto the coupling member 18, which is in threaded or other engagement with a union 19, which latter may be in threaded engagement with the wall 7 as at 20 or secured thereto in any desired or conventional manner. The union 19 is provided with a valve 21 having an actuating handle 22 and a counterbalance 23, whereby passage of steam through the passageway 24 to the conduit 17 may be accurately controlled. It will be understood that the coupling 16 is provided with a flange or shoulder 25, with which a nut 26 engages, and since said nut 26 is in threaded engagement with the apertured connection 14, the conduit 17 is secured in a fluid tight condition relatively to the apertured connection 14. The passage 13 is preferably recessed as at 27 in order to provide for the passage of the steam around the forward end 28 of the set screw 29, which has threaded engagement with an enlargement of the frame 1, and is provided with a lock nut 30, whereby the same may be fixed in its adjusted position. The forward end of said screw 29 extends through the wall of the frame and abuts against elastic or resilient means shown in the present instance as a spring 31, the ends of which engage the walls of the recesses 32 in an intermediate member 33, the rearward movement of which is limited by the lugs or flanges 34. The member 33 is apertured at each end, as indicated at 35, in order that the fluid may pass in rear of the gage glass 36 to the passage 37 formed therein, when the parts are in assembled condition.

The gage glass 36 is provided with reflexes 38 and the glass, with the exception of the reflexes and the sight portion, is protected with a shrouded material 39 preferably of metal which protects the glass from the destructive effects of the fluid contained within the frame. This shroud is preferably provided on one face with serrations 40 which, when the parts are assembled, engage the face 41 of the frame and form a fluid tight joint therewith. The front face of the member 33 is adapted to closely engage that portion of the shroud which extends over the rear face of the gage glass 36, and the inner wall of the member 33 in rear of the reflexes 38 is suitably colored at 42 in order to provide a background for the water column. The glass 36 is located out of alinement with the steam passage 13 and may be readily removed from the frame without removing the frame from the fitting since a closure 43 is provided which preferably is in threaded engagement with the frame and if desired the opposite end of the frame may be provided with a removable closure 44, whereby upon the removal of either of these closures 43 or 44, the gage glass 36, as well as the intermediate member 33 and the spring 31, may be readily removed when desired and the seat for the gage glass may be accurately formed.

45 designates a sight opening, the sides of which are preferably beveled as indicated at 46 in order that the clear end of the glass will be covered, thereby preventing a mistake in the reading of a disappearing water column. The low water reading will be absolutely distinct and clear cut and no mistake can be made of the time the water disappears from the gage.

In case gage frames of considerable length are employed, it is advantageous in some instances to form a tie across the front face of the frame as at 47, although this is not necessary in all instances, and in the shorter sizes can be dispensed with.

My novel water gage system provides means for readily cleansing the boiler water connection and the gage frame so that the same may be cleaned by means of a wire brush or other instrumentalities, thereby removing the accumulation of scale or other foreign material which in course of time obstructs the opening and causes a false reading.

48 designates a conduit in threaded engagement with the frame 1, so that the passage in such conduit is in alinement with the passage 3, and in the present instance, the conduit 48 preferably extends into the casing so as to form an extension 49, which extends beneath the gage glass 36, and forms a stop to limit the downward movement thereof when the device is being taken apart. The conduit 48 is provided with a cleaning valve 50 permitting the passage of a brush or other instrument through the water connection to the boiler for the purpose of removing scale or other foreign material.

The conduit 48 is provided with a blow-off connection 51, which at a desired point is provided with a controlling valve 52, from which leads the conduit 53, which communicates with a discharge conduit 54, which latter may extend to any desired point of utilization, such as, for example, the ash-pit of the furnace. 55 designates a port in the frame 1, whereby the fluid when desired may pass through the apertured conduit 56 having threaded or other engagement with the frame 1, said conduit being provided with a cleaning valve 57, permitting the cleaning of the water column and the glass with a brush or other instrument, and being also provided with a valve 58 which controls the passage of fluid from the conduit 56 to the main blow-off connection 54.

It will be noted that at the upper end of the frame there is an enlarged passage 59 leading to the port 35 in the member 33, and at the lower portion of the frame there is an enlarged passage 60 communicating with the port 35 and the passages 3 and 13.

In some cases arising in practice, it is preferable to secure the gage frame to the boiler by a screw connection rather than a flange, it being understood that in the broad scope of my invention it is immaterial in what manner the frame is secured with respect to the boiler, and in Figs. 5 and 7 I have shown a construction wherein the water connection is a screw connection rather than a bolted one, and since many of the parts are similar in construction, I have identified the same by the same reference characters in order to avoid needless repetition. The frame may, if desired, be provided with a threaded connection 61, one end of which is in engagement with the frame 1, the other end thereof forming a ground joint or other seal at 62 with one end of a conduit 63, the other end being in threaded or other engagement as at 64 with the boiler 7.

65 designates a one way valve controlled passage for fluid through the connection 63. The member 61 is provided with a flange, with which engages the nut 67, which latter is in threaded engagement with the connection 63 in order to form a fluid tight seal between the parts 61 and 63.

If desired, the plug 44 as seen in Fig. 7 may be provided with an extension 66, which will limit the downward movement of the glass 36 and the intermediate member 33.

In some cases arising in practice it is desirable to have the gage frame extend at an angle to the boiler, and in Fig. 6 I have shown an angled form of a frame construction 67 provided with a threaded aperture 68 adapted to be connected with the boiler and having an apertured boss 69 to which is removably secured a valve plug 70, having an aperture 71 therethrough controlled by a one way valve 72 and also provided with a port 73 preferably valve controlled.

In some cases arising in practice it is desirable to employ what is known as a stem end connection, and in Figs. 8 to 10 inclusive, I have shown an embodiment of my invention which may be advantageously employed. 74 designates a frame having the apertured connections 75 at opposite ends thereof, which are adapted to be secured to the fittings in the usual manner. The frame is provided with closures 76 and 77 which provide for the ready removal of the intermediate mechanism of the frame. 78 is the sight opening, the lower face of which is preferably beveled, as indicated at 79. 80 designates the gage glass which is shrouded with a metal or other coating 81, which extends around the sides of the glass and on a portion of the front and rear face thereof in order to form a double seal. 82 is an intermediate member which is provided with ports 83 and 84 thereby, when the ports are in assembled position, forming a passage 85 in rear of the reflexes 86 of the gage glass. The rear wall of the passage 85 is prepared as at 87 to form a colored background. The intermediate member 82 is provided with rearwardly extending lugs 88 and 89, which are recessed in order to receive resilient or elastic means such as the spring 90. The frame is provided with the lugs 91 and 92, which prevent the improper movement of the member 82.

93 designates a set screw having threaded engagement with the frame 74, having its forward end adapted to engage the spring 90, a suitable lock nut 94 being provided to maintain the set screw 93 in the position given thereto. The frame is preferably recessed, as at 95, in order that the set screw 93 will not form an obstruction for the fluid passing thereby. It will be noted that the member 82 engages the rear face of the shroud 81 in a similar manner to that already described, and in this embodiment I have not shown an independent steam passage in rear of the spring and the intermediate member, although it will be apparent that this embodiment, in the broad scope of the invention and underlying principle, is the same in this embodiment as in that hereinbefore described. The nut 94 not only locks the set screw in fixed position, but also prevents leakage around the set screw. Preferably a small amount of packing is wound around the set screw and the nut brought down solid.

Special attention is directed to some of the novel features of the present invention. The gage glass is contained wholly within the frame and is provided with a shrouding material or metal casing which protects the glass from the destructive effects of fluid within the frame. The shroud or metal casing is used in such a way as to form a double seal preventing leakage around the glass and the destruction of the same. Means are employed for pressing the edges of the shroud surrounding the sight opening tight to the glass, so that the shroud itself may not be torn from the glass by the fluid contained within the frame. The shrouded surface has a further means of providing a seal between the glass and the frame preventing leakage of the fluids. The shrouded glass is held in position by means of an intermediate member provided with a water column having a colored background. Resilient means are employed to maintain the shrouded glass and the intermediate member in assembled position, and a tension is placed on such resilient means which is communicated to the shrouded glass by means of the intermediate member, pressing the glass at all times in close engagement with its seat. Steam pressure automatically increases the pressure and maintains a fluid tight seal under varying pressures of the fluid. Provisions are made for varying and maintaining tension and for releasing the glass and the intermediate member in order that they may be taken out of either end of the frame. The expansions and contractions of the frame and glass caused by heat and cold and by high and low pressures are permitted by the resilient means and flexible steam connection, thereby avoiding strains, leakage, breakage and the destruction of the glass and frame caused by said expansions and contractions.

The gage glass is located out of alinement with the steam passage in such a way that the glass does not receive the impact of the steam from the steam connection to the boiler at such times as the steam connection is blown out. A steam passageway in the back of the frame is provided direct to the blow-off system in order to avoid the impact of the steam on the glass. The frame is preferably open at both ends for the ready removal of the shrouded glass and the intermediate member and its adjuncts. It is also for the purpose of the perfect forming of the face of the frame forming the joint with the glass.

Special attention is also directed to the novel manner in which provision has been made for cleaning the water column and for cleaning the water passageway from the boiler to the top of the water column, including cleaning of the glass and the colored background by means of a brush or other instrument, in order to thoroughly remove scale, sediment or other obstructions, insuring an absolutely safe and accurate reading of the gage, thereby preventing false readings on the water gage caused by obstructed passageways. I have provided positive cleaning means. If the boiler is in use, valves 10 and 21 may be closed, whereupon the water may be drained off through the blow-off system. The cleaning valve 57 may be opened and since this valve is a one way valve, a cleaning brush or other instrument may be passed therethrough and through the conduit 56, so as to engage with the reflexes of the glass and the walls of the water column, thereby enabling me to positively remove any accumulations of foreign material which may have been deposited in the water column, or the glass, or the walls thereof. The water connections 3 and 4 may also be readily cleaned in a free positive manner by the insertion of a brush or other implement by opening the valve 50, whereupon such implement may pass through the passage 3 and also, if desired, passage 4 so that any accumulations in said passages or on the walls thereof may be readily removed. When the boiler is shut down, then the cleaning instrument may pass through the passage 4 and through the one way valve 10, so that the entire water connections to the boiler may be absolutely clean.

If desired, the water connection may be blown through the gage by actuating the valve 52, whereupon the water will pass through the water connection 51, and thence to the main blow-off connection 54. If it is desired to blow steam through the gage, the valve 58 is actuated, whereupon the steam may be blown through the conduit 56 and thence through the main blow-off 54 to the atmosphere or any desired point, such as for example, the ash-pit of the furnace.

Special attention is also directed to my novel gage whereby I am enabled to obtain a low reading of the water column and at the same time cover up the lower end portion of the glass by means of an extended bevel. It will be seen that my connection to the boiler is a connection extending laterally at an angle to the water column, thereby bringing the water column of the gage close to the connection of the boiler. In gages heretofore employed in which a reflex glass is used, the construction has been such that it has not been practical to obtain a low reading of water, owing to the stem ends and the valve connections, therefore it was found necessary to utilize the whole of the lower end of the glass in order to secure the lowest possible reading. By bringing the reading low I am enabled to cover up, by means of an extended bevel, the lower end of the glass thereby eliminating a twilight zone caused by the darkened background seen through the clear glass which gives a reading corresponding to a water reading which might cause an engineer to think there was still water in the gage, when in reality it had entirely disappeared.

Special attention is also directed to the flexible connection 17, by employment of which I am enabled to entirely dispense with the use of packing in the steam connections to the frame, and also dispense with the use of packing in the water connection to the frame. By varying the length of the connection 17, the gage may be secured to any type of boiler without any change whatever in the gage construction, the advantage of which will be apparent to those skilled in this art.

Attention is also directed to the novel construction of the intermediate member employed and the manner of assembling the spring in respect thereto since both the intermediate member and the spring may be bodily removed without taking them apart. The sides of the glass and the faces and rear, with the exception of the sight opening, are enshrouded in such a manner that they are absolutely protected from the destructive action from any fluid within the frame, and since the glass is wholly contained within the frame, the steam pressure causes the shrouding material to closely engage with the glass and automatically assists in preventing steam or other fluids from passing between the shroud and the glass.

Special attention is also directed to the construction of my novel gage whereby it is set to face at any angle and the novel arrangement of cleaning ports and blow-off connections with respect thereto. In my present invention, the arrangement is such as to provide large, clear, free, unobstructed passageways and ports, which combined with the various novel means heretofore mentioned, provide a water gage which is durable, reliable as to readings, free from leakages and breakages, caused by expansion and contraction, avoiding erosion, destruction, and breakage of glasses, and the dangers of personal injury from broken glass and false readings of a water gage caused by obstructed passageways.

It will now be apparent that I have devised a novel and useful construction of a water gage system which embodies the features of advantage enumerated as desirable in the statement of the invention and the above description, and while I have, in the present instance, shown and described preferred embodiments thereof which have been found in practice to give satisfactory and reliable results, it is to be understood that the same is susceptible of modification in various particulars without departing from the spirit or scope of the invention or sacrificing any of its advantages.

Having thus described my invention, what I claim as new and desire to secure by Letters Patent, is:—

1. The combination in a gage, of a frame having a sight opening, a glass having the portion contacting with said frame metal incased, and means within the frame for securing said glass in position to cause the metal incasing to seal the joint.

2. The combination in a gage, of a frame having a sight opening, a glass having the portion contacting with said frame metal incased, means for securing said glass in position, and a removable closure for permitting the removal of the glass from the frame without removing the gage from its fittings.

3. The combination in a gage, of a frame having a sight opening, a glass contained within the frame and having its sides and a portion of its front and rear faces coated with a material having a different coefficient of expansion from that of the glass, and means to move the glass toward the frame to secure said glass in assembled position with respect to the sight opening to cause said material to seal the joint.

4. The combination in a gage, of a frame having a sight opening, a glass covering said opening, a coating of relatively soft material on the contact portions of said glass, and a metal spring for securing said glass in assembled position.

5. The combination in a gage, of a frame having a sight opening, a glass covering said opening, means for retaining said glass in assembled position, and a plurality of removable closures for permitting the removal of said glass from either end of the frame without the removal of said frame from its fittings.

6. The combination in a gage, of a frame having a sight opening, a glass covering said opening, means for retaining said glass in position, and a removable closure permitting the removal of said glass from the frame without the removal from said frame of said retaining means.

7. The combination in a gage, of a frame having a sight opening, a glass covering said opening, a member engaging the rear face of said glass, yielding means interlocked with said member to retain said glass in sealed condition with respect to the sight opening, and an abutment for such yielding means and adjustably carried by said frame.

8. The combination in a gage, of a frame having a sight opening, a glass contained wholly within the frame and having its sides and contact portions enshrouded, the forward face of said glass covering the sight opening, a member having a passage therethrough and abutting against the rear face of said glass, and yielding means coacting with said member to maintain said glass in fluid tight condition with respect to said frame.

9. The combination in a gage, of a frame having a sight opening, a glass covering said opening, a non-corrodible and heat resistant material for securing the glass in sealed condition with respect to the sight opening, and yielding means for exerting a pressure against said material within the frame.

10. The combination in a gage, of a frame having a sight opening, a glass having its contact faces and sides metal incased, a member engaging the rear face of said glass, and a yielding, non-corrodible and heat resistant material coacting with such member to secure the glass in sealed condition.

11. The combination in a gage, of a frame having a sight opening, a glass having its sides and a portion of its front and rear faces covered with heat resistant material, yielding means for securing the glass in sealed condition, and an abutment adjustably carried by said frame coacting with said yielding means intermediate the ends thereof.

12. The combination in a gage, of a frame having a sight opening, a glass having its sides and a portion of its front and rear faces enshrouded with a material having a different coefficient of expansion from that of the glass, a member engaging a rear face of said material and provided with a passage, the rear face of said passage forming a background for the glass, and means coacting with said member to maintain the glass in sealed condition.

13. The combination in a gage, of a frame having a passage therethrough, and a sight opening and provided with a frame opening in proximity to the sight opening, a closure for said frame opening, a glass for the frame and adapted to be inserted through said frame opening, an abutment carried by the frame, and yielding means intermediate said abutment and the glass for retaining the latter in position.

14. The combination in a gage, of a frame having apertured extensions and provided with a sight opening, a glass covering said sight opening and out of alinement with said extensions, material covering the sides, ends and the front and rear faces of the glass with the exception of the sight portion, an abutment adjustably carried by the frame, a member engaging the rear face of said material to secure the glass in position and form the gasket therefor, and yielding means intermediate said member and said abutment.

15. The combination in a gage, of a frame having a steam passage therethrough and provided with a sight opening, a glass covering said sight opening and out of alinement with said steam passage, a member in rear of said glass forming a registering column, yielding means engaging said member for moving said glass toward its seat, and a removable closure for permitting the cleaning the rear face of said glass without removing the glass from the frame.

16. The combination in a gage, of a frame having a steam passage therethrough and provided with a sight opening, a glass covering said sight opening and out of alinement with said steam passage, a member in rear of said glass forming a registering column, yielding means engaging said member for retaining said glass in position, a removable closure for said frame to permit when removed the insertion of a cleaning implement to clean the rear face of the glass, and means to provide for the removal of said glass and said member from the frame without removing the frame from its fittings.

17. The combination in a gage, of a frame having a sight opening, means for connecting one end of the frame with the water end of the boiler, means for connecting the other end of the frame with the steam end of the boiler and including a flexible connection, a glass within the frame, sealing means between the glass and frame, and yielding means independent of the sealing means for securing the glass in assembled position.

18. The combination in a gage, of a frame having a sight opening, means for connecting one end of the frame to the water end of the boiler, means for connecting the other end of the frame to the steam end of the boiler, a glass covering the sight opening, yielding means for securing the glass in position, and said frame having a controllable opening adapted to receive a cleaning implement.

19. The combination in a gage, of a frame having a sight opening, a glass for said opening, means for securing the glass in assembled position, a valve controlled fitting secured to the water end of the boiler and communicating with one end of said frame, means including a flexible conduit for connecting the other end of said frame with the steam end of the boiler, said fitting being adapted to permit the insertion of a cleaning implement through the water connection, and devices for controlling the blowing of steam through said frame.

20. The combination in a gage, of a frame having a sight opening and provided at its lower end with an inclined wall, a glass having reflexes on its rear face and covering said opening, a shroud for said glass, and yielding means for retaining said glass in position.

21. In a water gage, a frame having a sight opening, a glass covering said opening, yielding means coöperating with the rear face of said glass to retain it in assembled position, a water and a steam connection for connecting the frame to a boiler, and a valve carried by said frame and adapted when in open position to permit the insertion of a cleaning implement into said water connection.

22. In a water gage, a frame having a sight opening, a glass for said frame, a water connection leading from said frame, a steam connection leading from said frame, controllable means in alinement with said water connection for permitting the insertion of a cleaning implement through the latter, and means in alinement with the steam connection for controlling the blowing of steam through the frame.

23. In a water gage, a frame having a sight opening, a glass having contact portions, said contact portions being shrouded, a member engaging the rear face of said shroud, a spring engaging said member, and an adjustable abutment for said spring.

24. In a water gage, a frame having a sight opening, the lower end of which is beveled, a shrouded reflex glass for the sight opening, and having a clear portion at its lower end, the beveled portion of said frame covering such clear portion and means for securing said glass in assembled position.

25. In a water gage, a frame having a sight opening, the lower end of which is beveled, a reflex glass for said sight opening, and yielding means for securing said glass in position.

26. In a water gage, a frame having a sight opening, the lower wall of which is beveled, a reflex glass having its sides and a portion of its front and rear faces metal-incased, a member engaging the rear face of the incasing metal and forming the registering column, said frame having a steam passage in rear of the registering column and communicating with each end thereof, and yielding means engaging said member for securing the glass in sealed condition.

27. In a water gage, a frame having a sight opening, a reflex glass having its sides and a portion of its forward and rear faces metal-incased, the front face of the incasing metal being of irregular contour, and yielding means for securing said glass in sealed condition.

28. In a water gage, a frame having a sight opening, a reflex glass having its sides and contact faces metal-incased, a member engaging said glass, yielding means engaging said member, and an adjustable abutment on which said yielding means is fulcrumed whereby the relative movement of said glass and frame is permitted.

29. In a water gage, a frame having a sight opening, a metal-incased reflex glass for said opening, a member in rear of said glass having a registering column, yielding means for securing said member in position, said frame having a steam passage in rear of said member and communicating with said registering column at each end thereof, means for connecting one end of said registering column with the boiler below the water line, and a flexible connection for connecting the steam end of the frame with the boiler above the water line.

30. In a water gage, a frame having a sight opening, a glass for said frame, means for securing said glass in position, a connection leading from one end of said frame to the boiler, a valve controlled extension in alinement with said connection whereby a cleaning implement may be passed through said connection, and a flexible connection between the steam portion of the boiler and the steam end of the gage.

31. In a water gage, a frame having a sight opening, a glass within the frame covering said sight opening, a member in rear of said glass forming a registering column, a spring engaging said member, said frame having a steam passage in rear of said member, a set screw carried by said frame and extending through said steam passage and engaging said spring, said frame having a recess permitting passage of steam around said set screw, and means for securing said gage in position.

32. In a water gage, a frame having a sight opening and an opening at each end thereof in proximity to said sight opening, a closure for each of said openings, a metal-incased glass adapted to be introduced through either of said openings and cover the sight opening, yielding means for securing said glass in assembled position, means for securing the frame in assembled position with respect to the boiler, and said last named means including a valve through which the walls of the registering column can be cleaned without removing the frame from the boiler.

33. In a water gage, a frame having a sight opening, a glass for said frame, means for securing said glass in position, said frame having a steam passage out of alinement with the glass, and forming part of the frame and communicating with said steam passage for controlling the blowing of steam through said frame, and flexible means for connecting the steam end of the gage with the boiler above the water line.

34. In a water gage, a frame having a sight opening, a glass covering said opening, yielding means for securing said glass in position, said frame having a steam passage out of alinement with said glass, a flexible connection from the steam end of the gage to the steam end of the boiler, a connection from the water end of the gage to the water end of the boiler, and means adapted to have passed therethrough a cleaning implement for cleaning the water connection.

35. In a water gage, a frame having a sight opening and a tie across the sight opening intermediate the ends thereof, a glass for said sight opening, and yielding means in alinement with said tie for securing the glass in assembled condition.

36. In a water gage, a frame having a sight opening, a glass for the sight opening, means for retaining the glass in position, said frame having a registering column in rear of the glass, and an independent steam passage and a water connection communicating with the registering column and extending at an angle thereto.

37. In a water gage, a frame, having a steam passage and provided with a registering column communicating with said steam passage at its ends but out of alinement therewith, and devices carried thereby for controlling the blowing of steam through the steam passage of the frame.

38. In a water gage, a frame having a steam passage, a flexible steam connection communicating therewith and with a boiler, a water connection communicating therewith and with the boiler, and a column communicating with the steam passage and with the water connection and means whereby steam can be passed through the steam passage without such steam passing through the registering column.

39. In a water gage, a frame having a registering column and a steam passage and devices having a controllable aperture for permitting the insertion of a cleaning implement into the registering column and for controlling the blowing off of steam through the steam passage.

40. In a water gage, a frame having a registering column, and a steam passage on one side of the registering column, said frame having an opening communicating with the registering column and the steam passage, a closure for said opening, a water connection communicating with the steam passage and the registering column, said frame having an opening communicating with the water connection, and a closure for said last named opening.

41. In a water gage, a frame having a registering column, and a steam passage on one side of the registering column, said frame having an opening communicating with the registering column and the steam passage, a closure for said opening, a water connection communicating with the steam passage and the registering column, said frame having an opening communicating with the water connection, a closure for said last named opening, and valve controlled conduits communicating with said openings.

42. In a water gage, a frame, a valve controlled water connection and a valve controlled flexible connection communicating therewith, said frame having a registering column, and means provided with a controllable aperture for permitting the insertion of a cleaning implement into the water connection and into the registering column.

43. The combination in a gage of a casing having a sight opening, and an opening at each end in rear of the sight opening, a closure for each of the end openings, a glass surrounding the sight opening and having its sides, ends and a portion of its front and rear face incased with steam resistant material, the front face of said material engaging the casing to form a seal around the sight opening, and means engaging the rear face of said material to maintain the glass in position.

44. The combination in a gage of a casing having a sight opening, and an opening at each end in rear of the sight opening, a closure for each of the end openings, a glass surrounding the sight opening and having its sides, ends and a portion of its front and rear face incased with steam resistant material, the front face of said material engaging the casing to form a seal around the sight opening, and yielding means engaging the rear face of said material to maintain the glass in position.

45. The combination in a gage for registering purposes, of a casing having a sight opening and a seat surrounding the sight opening, the ends of said gage being provided with controllable openings, a glass having its sides, ends and a portion of its front and rear faces metal incased to form a double seal on the front and rear faces of the glass, and yielding means for retaining the glass in position.

46. The combination in a gage for registering purposes, of a casing having a sight opening and a seat surrounding the sight opening, the ends of said gage being provided with controllable openings, a glass having its sides, ends and a portion of its front and rear faces metal incased to form a double seal on the front and rear faces of the glass, and an adjustable abutment for said yielding means adjustably carried by said casing.

47. The combination in a gage for registering purposes, of a casing having a sight opening and a seat surrounding the sight opening, the ends of said gage being provided with controllable openings, a glass having its sides, ends and a portion of its front and rear faces metal incased to form a double seal on the front and rear faces of the glass, yielding means for retaining the glass in position, an abutment for said yielding means, adjustably supported, and devices for locking said abutment in its adjusted position.

48. The combination in a registering gage, of a casing having a sight opening and provided with an opening in the rear of said sight opening, a closure for said opening, a glass having its sides, ends and a portion of its front and rear faces metal incased, the forward portion of said metal covering the sight opening, an intermediate member engaging the rear face of said metal and having an aperture therethrough to permit fluid to pass in rear of the glass, yielding means carried by said member for securing the glass in position, and means for varying the tension of said yielding means.

49. The combination in a registering gage, of a casing having a sight opening and provided with an opening in the rear of said sight opening, a closure for said opening, a glass having its sides, ends and a portion of its front and rear faces metal incased, the forward portion of said metal covering the sight opening, an intermediate member engaging the rear face of said metal and having an aperture therethrough to permit fluid to pass in rear of the glass, means for varying the tension of said yielding means, and said casing having means for guiding said member.

50. The combination in a registering gage, of a casing having a sight opening and an opening in rear of said sight opening, a glass having its sides and a portion of its front and rear faces coated with a material capable of resisting the destructive action of the fluid being registered, a member engaging the rear face of said coating and apertured at each end to permit fluid to pass in rear of the glass, said member forming a back ground for the glass, yielding means carried by said member and retaining the glass in position, and an abutment for said means.

51. The combination in a registering gage, of a casing having a sight opening, a steam passage, and a registering column intermediate the sight opening and said steam passage and out of alinement with said steam passage, a glass having its sides, ends and a portion of its front and rear faces enshrouded with metal, the front face of said shroud covering the sight opening, an apertured member engaging the face of said shroud and having laterally extending lugs forming seats, a spring having its end interlocked with said seats, said casing having means for guiding said lugs, and means movably carried by said casing and forming an abutment for said spring.

52. In a gage, a frame having a sight opening, a glass for the sight opening, sealing means forming a joint, and yielding means independent of the sealing means for maintaining the joint in sealed condition.

53. The combination in a gage, of a frame having a sight opening, a glass having a metal incased face presented to the frame and forming a joint, yielding means to secure said glass with respect to the sight opening to cause said metal incasing to seal the joint.

54. In a gage, a frame provided with a sight opening and having a water connection and a steam connection, and having an opening in substantial alinement with the water connection, a removable closure for said opening, a glass covering said opening, and yielding means within said frame to move said glass toward said opening.

55. In a gage, a frame, a glass, and means contributing with the fluid under pressure in the gage to cause a pressure to be exerted against the sides, ends, and a portion of the front and rear faces of the glass to pressure-lock the glass.

56. In a gage, a frame having a sight opening, a glass having a face presented to the frame, metal sealing means between the glass and the frame, and resilient means within the frame for maintaining the joint in sealed condition.

57. In a gage, a frame having a sight opening, a glass for the sight opening, a casing for said glass, and means contributing with the fluid under pressure in the gage for sealing the sides and ends of said glass within said casing.

58. In a gage, a frame having a sight opening, a glass for the sight opening, a sealing means forming a joint, and means for maintaining a double seal between the glass and the sealing means.

59. In a gage, a frame having a sight opening, a glass for the sight opening presenting a face to the frame, and sealing means between the glass and said frame, and in the rear of said glass in order to form a double seal against leakage and to protect the sides and ends of the glass against the destructive fluids being registered.

CLARENCE B. GROFF.

Witnesses:
H. S. FAIRBANKS,
C. D. McVAY.